Aug. 8, 1967          W. W. BURHOP          3,334,841
PLASTIC SPOOL OF COMPLEMENTARY HALVES
Filed July 7, 1966          4 Sheets-Sheet 1
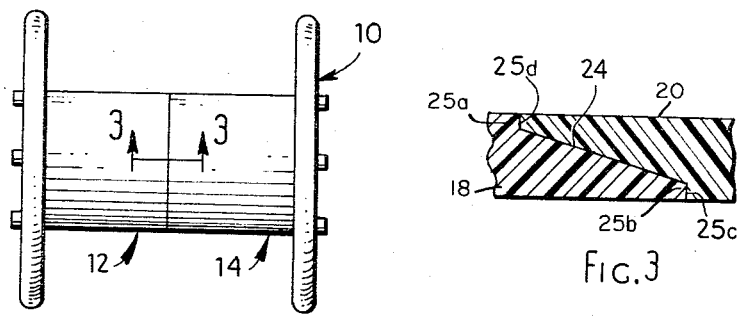
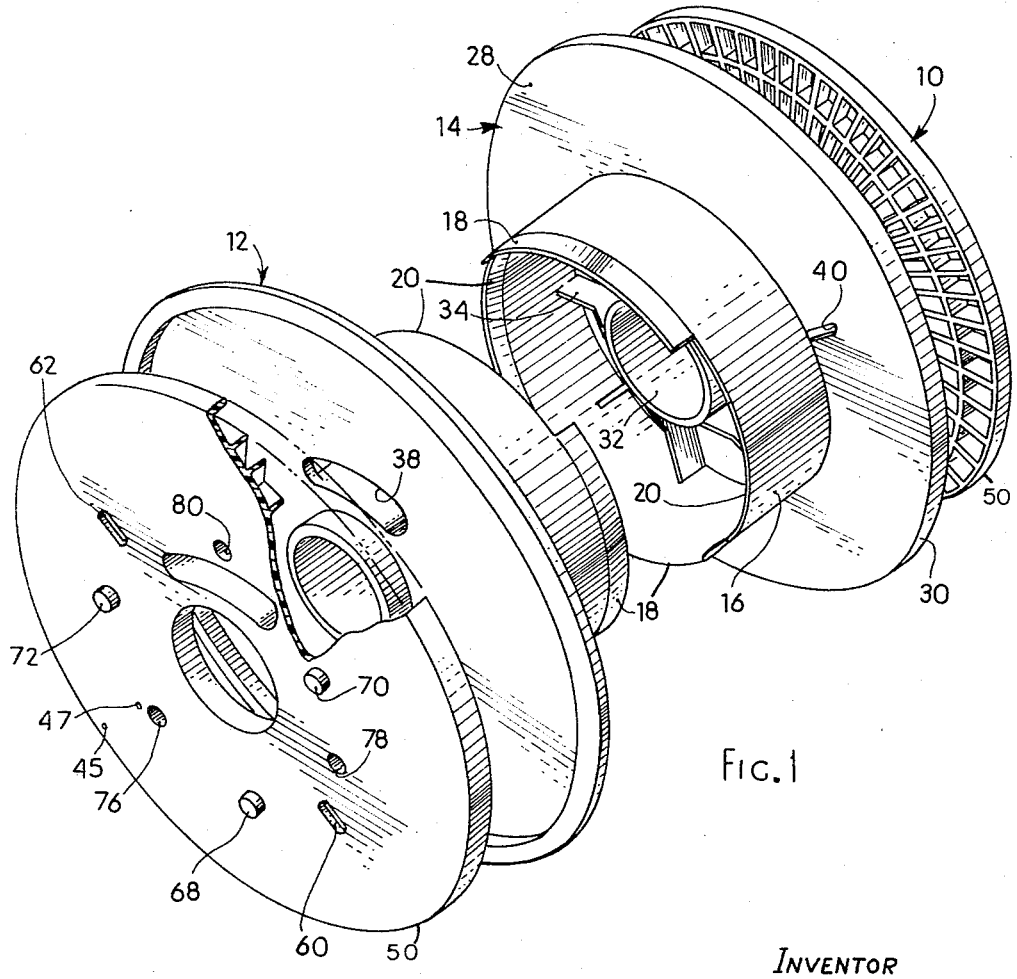
INVENTOR
WALDEMAR W. BURHOP
*Albert L. Jeffers*
ATTORNEY Aug. 8, 1967 W. W. BURHOP 3,334,841
PLASTIC SPOOL OF COMPLEMENTARY HALVES
Filed July 7, 1966 4 Sheets-Sheet 2
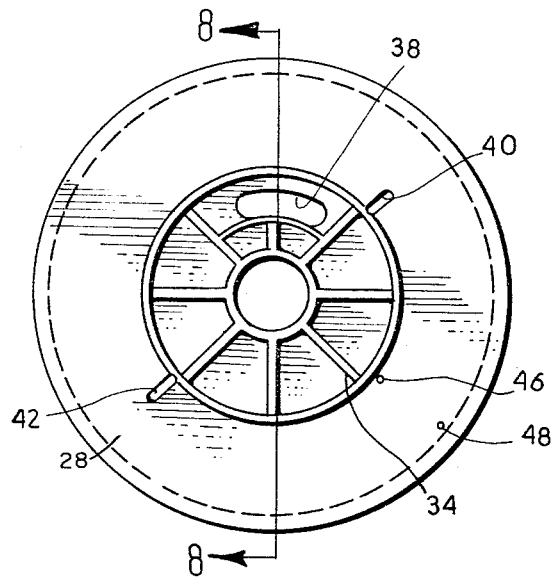
Fig. 7
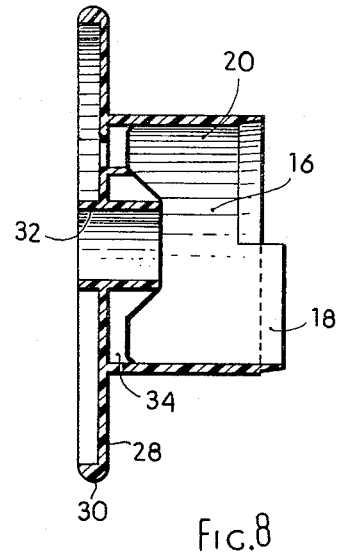
Fig. 8
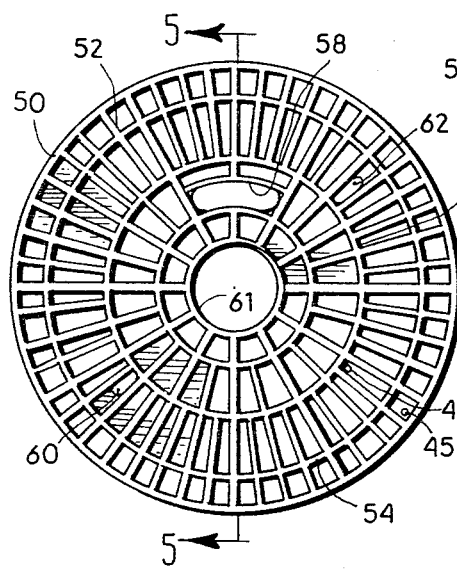
Fig. 4
Fig. 5
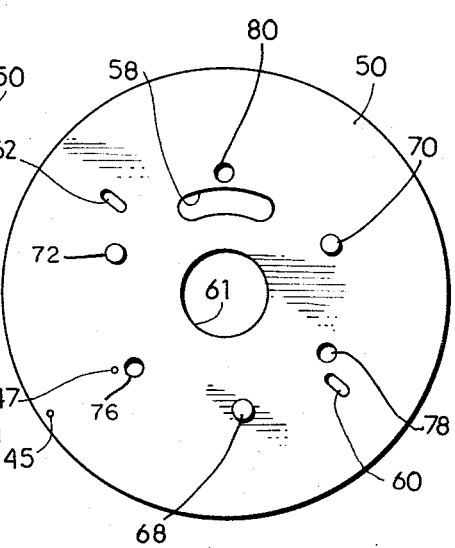
Fig. 6
INVENTOR
WALDEMAR W. BURHOP
Albert L. Jeffers
ATTORNEY Aug. 8, 1967  W. W. BURHOP  3,334,841
PLASTIC SPOOL OF COMPLEMENTARY HALVES
Filed July 7, 1966  4 Sheets-Sheet 3
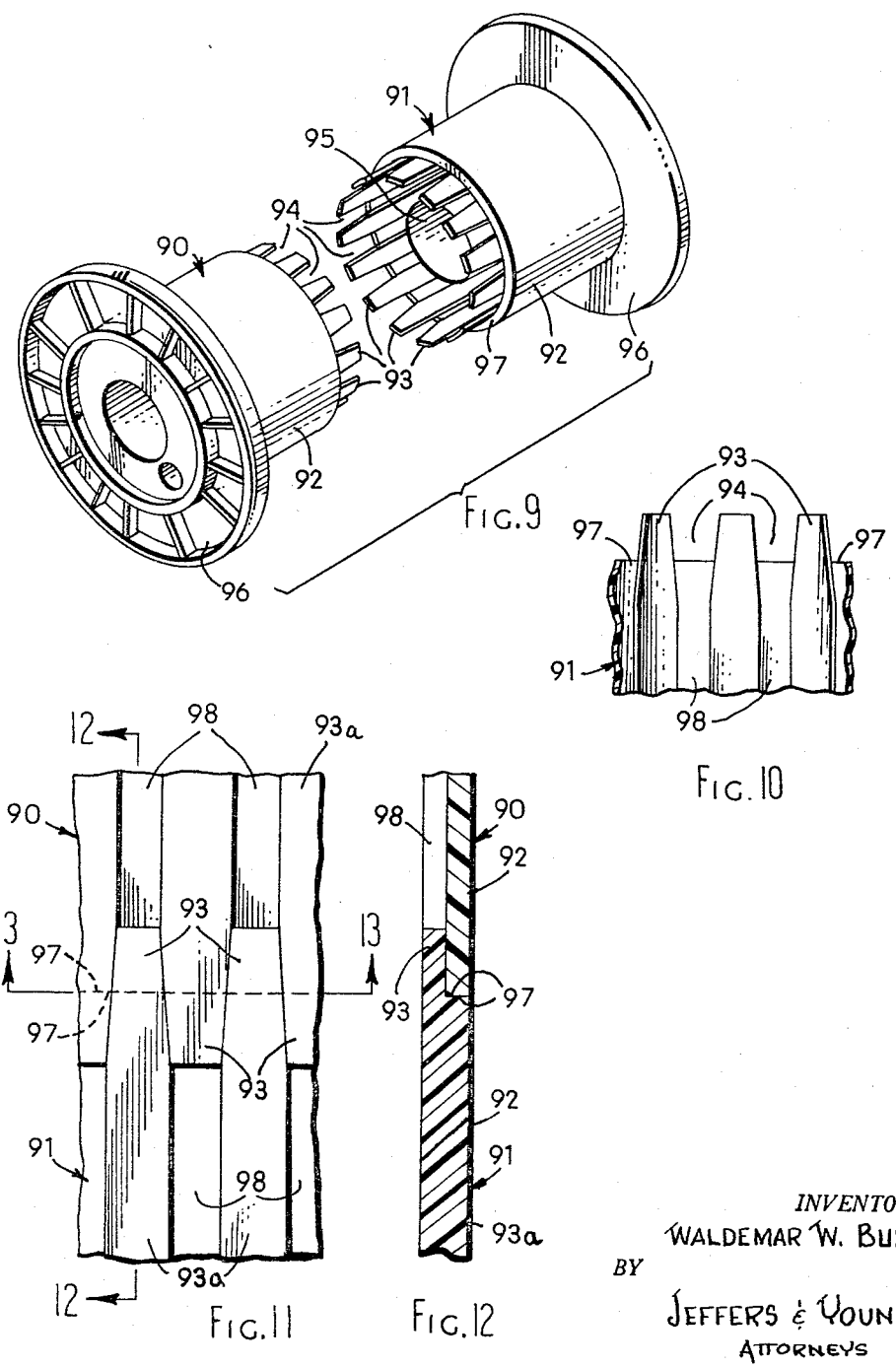
INVENTOR.
WALDEMAR W. BURHOP
BY
JEFFERS & YOUNG
ATTORNEYS Aug. 8, 1967     W. W. BURHOP     3,334,841
PLASTIC SPOOL OF COMPLEMENTARY HALVES
Filed July 7, 1966     4 Sheets-Sheet 4

*INVENTOR.*
WALDEMAR W. BURHOP
BY JEFFERS & YOUNG
ATTORNEYS

United States Patent Office 3,334,841
Patented Aug. 8, 1967

3,334,841
PLASTIC SPOOL OF COMPLEMENTARY HALVES
Waldemar W. Burhop, 3033 Wayne Trace,
Fort Wayne, Ind. 46806
Filed July 7, 1966, Ser. No. 565,047
6 Claims. (Cl. 242—118.61)

ABSTRACT OF THE DISCLOSURE

A spool is formed of two identical complementary halves each having a cylindrical drum with an abutting surface at one end a flange at the other end. Spaced tongues are positioned radially inward from the outer surface of the drum and extend longitudinally along the drum in both directions from the abutting surface. The spaces between the tongues have the same size and shape to complement the tongues. The halves are joined together so that the tongues of each half fit into the spaces of the other half.

---

This application is a continuation-in-part of my copending application Ser. No. 419,660, filed Dec. 21, 1964, and subsequently abandoned.

This invention relates to an improved plastic spool, and particularly to a plastic spool for storing fine magnet wire.

Spools of the type described are used not only for storage of wire and for transporting the wire, but they are also used for dispensing wire. These spools are generally mounted on suitable spindles at the point of use and the wire is then withdrawn from the spool. The spool may be rotated at a controlled speed in order to pay out the wire in accordance with the manufacturing schedule, or the wire may be withdrawn over one end. It will be readily seen that a spool serves a multiplicity of uses and must meet certain functional requirements in order to accomplish all of these uses. For example, the spool must be durable so it can transport the wire without damage from the point of winding onto the spool to the point of ultimate use. Moreover, the spool must be of light weight, and of precise construction so that it can be mounted on its associated spindle or other structure on the fabricating machine and there used for its intended purpose. If the spool or bobbin is not precisely manufactured, it will not be as adapted for satisfactory payout of the wire at the apparatus.

It is one of the objects of the present invention to provide a spool construction which will meet all of the described functional requirements, and which will be simple and inexpensive. It is an object of the present invention to provide a spool construction comprised of two identical spool halves of plastic material which can be simply interfitted in final assembly to produce the finished product. Consequently, there is only a single die set needed for a spool half, the two spool halves being identical and interfitted by any one of several different methods including solvating, welding, bonding, or other to produce a finished product.

A further object of this invention is to provide a strengthening disc which is adapted to be readily inserted in each end flange end so that the spool will meet the strength and rigidity requirements of any specific application.

It is an overall object of the present invention to provide a spool which combines both strength and lightness in weight, and which consists of a few number of component parts, this last feature being achieved by forming the spool in two identical halves which are joined together to form the complete spool.

It is a further feature of the present invention to utilize a system of inspection openings within part of the spool by which the user can readily detect the amount of available wire during the payout operation.

It is a further object of the present invention to provide novel, improved interlocking means on the spools so that when the spools are stacked, portions of adjacent spools are interlocked in order to provide more stable stacking and storage of the spools. As a consequence, the spools are more securely held together and accidental movements and damage of the spools during transportation is reduced.

It is a still further object of the present invention to provide a spool which can be constructed from a relatively few number of parts and wherein the spool is constructed of two identical halves which are assembled together to form a complete spool which is of light weight and which is also of durable construction with strengthening ribs and webs which prevent the spool from distorting, both during storage and use.

Other objects and features of the present invention will become apparent from a consideration of the following description, which proceeds with reference to the accompanying drawing, wherein:

FIGURE 1 is an exploded view of spool components, in accordance with one embodiment of the invention, prior to their assembly;

FIGURE 2 is a front elevation view of the spool of FIGURE 1 after it is assembled;

FIGURE 3 is an enlarged detail view of the joint formed between the two spool halves, the section view being taken on line 3—3 of FIGURE 2;

FIGURE 4 is a detail view of one of the strengthening discs of the spool, this being the inside view of the strengthening disc which is mounted at the outboard side of the spool;

FIGURE 5 is a section view taken at line 5—5 of FIGURE 4;

FIGURE 6 is a view of the opposite side of the strengthening disc in FIGURE 4, this being the outside view of the strengthening disc;

FIGURE 7 is an elevation view of a spool end flange to which the strengthening disc of FIGURE 4 is joined;

FIGURE 8 is a section view taken on line 8—8 of FIGURE 7;

FIGURE 9 is an exploded view of two spool components, in accordance with another embodiment of the invention, prior to their assembly;

FIGURE 10 is an enlarged view of part of the mating portion of one of the spool components of FIGURE 9;

FIGURE 11 is an enlarged view of part of the mating portions of the two joined spool components of FIGURE 9;

FIGURE 12 is a cross sectional view taken along the lines 12—12 of FIGURE 11;

Figure 13:
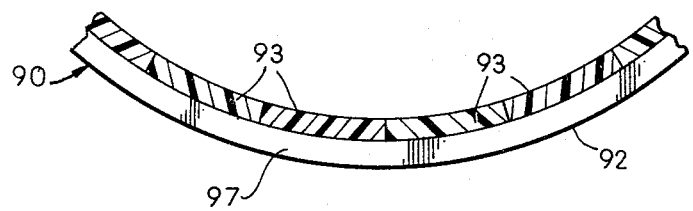
FIGURE 13 is a cross sectional view taken along the lines 13—13 of FIGURE 11.

Referring now to the drawings, the spool or bobbin, designated generally by reference numeral 10, consists of two identical halves 12 and 14 (FIGURES 1 and 2) which can be constructed from the same die (or in mass production from a plurality of similar dies), thereby reducing the manufacturing cost and simplifying the construction by standardizing the component parts. The following detailed description of the spool half 12 will be understood to apply for the spool half 14. The two halves 12, 14 are joined together to make the completed assembly or spool.

Referring to FIGURE 1, each spool half includes a barrel half 16 which forms a drum on which wire or other material is wrapped for transportation and payout. The barrel half 16 has one or more female sections 20 (two being shown), an one or more male sections 18 (two being shown.) The barrel half 16 has two male sections 18 alternated with two female sections 20, each section extending 90 degrees about the circumference of the barrel half. More or less sections can be use as long as they are complementary so that the male and female sections can be joined. Thus, the barrel half 16 may have N male sections alternated with N female sections, each section extending along the circumference for 180 degrees/N, where N is any integer. The ends of each male section 18 have an inner step 25a and an outer step 25b, and each female section 20 has an inner step 25c and an outer step 25d. The respective steps 25a, 25b and 25c, 25d are connected by tapered surfaces 24 (FIGURE 3). The sides of the steps and the tapered surfaces between adjacent female and male sections may be either straight as indicated in FIGURES 1, 2, and 8, or tapered according to design preference.

The barrel 16 has an integral end flange or disc 28 with an annular rib 30 and a hub 32. A number of strengthening webs 34 are formed radially and interconnect with the hub 32, the end flange 28, and the barrel 16, to join these parts firmly together. The end flange 28 has an opening 38 therein for facilitating picking up and carrying of the loaded spool. There are also two 180 degree spaced elongated openings 40, 42 (FIGURE 7), which permit sighting through the disc to the surface of the barrel 16 for inspecting how much wire remains on the surface of the drum. These are sometimes referred to as inventory or inspection windows and while the spool is mounted on the apparatus during payout the inspection windows permit the user to see how much wire remains on the surface of the barrel. It is understood that if desired, more than two inventory windows may be used. The disc further includes two small openings 46 and 48 (FIGURE 7) through which ends of the wire are passed at the beginning and end of the winding operation.

There is joined to the end flange 28 a strengthening flange or disc 50 (FIGURES 4, 5, 6) which is dimensioned to fit within the annular confines of the annular rib 30. The strengthening disc 50 has a number of radially extending strengthening ribs 52 and circumferential ribs 54 and 56, the spacing of the ribs, and location of the ribs being designed for resisting the points of maximum stress. It will be noted that there are a greater number of strengthening ribs beyond the circumferential rib 56 which coincides with the diameter of the barrel 16 in order to resist the greater amount of stress which is encountered at that point. The strengthening disc 50 also has a handle opening 58 coinciding with the opening 38, in the end flange 28, and has elongated inspection openings or inventory windows 60, 62 coinciding with the inventory openings 40, 42 in the end flange 28. The strengthening disc 50 is provided with two small openings 45 and 47 to correspond with the openings 46 and 48 in the end flange 28. At the center of the strengthening disc 50 is an opening 61 which fits around the end of hub 32 of the end flange 28, the hub 32 providing the bearing mounting on the spindle of the winding apparatus as well as of that which pays out the wire. With two flanges or discs having a plurality of ribs, it is possible to greatly reduce the weight of material required for constructing the spool. Consequently, the spool is not only more economical to manufacture by reason of the reduction in plastic material required, but is also lighter in weight, whereby the spool is easier to handle and costs less to ship.

The two halves 12, 14 of the spool 10 are assembled together by lapping the tapered surfaces 24, and butting step 25a with step 25d, and step 25b with step 25c of the male and female sections 18, 20 respectively of the two barrels 16 (FIGURES 2 and 3). Each of the complementary female and male sections are secured together either by solvating the edges and surfaces with suitable solvent which causes the surfaces to weld together; by sonic welding; by providing a cement bonding agent between the two surfaces; or by other means.

When the spool is completely filled with wire, a number of said spools are transported in vertically stacked positions, i.e., the axis of rotation of the spools are disposed vertically. The adjoining discs of the spools are locked together by means of lugs 68, 70, 72 (FIGURE 1) which are spaced 120 degrees apart and which fit into coacting openings 76, 78, 80 of adjoining discs. Thus, the adjoining faces of adjacent discs are mechanically interlocked together to prevent slipping movement between the spools. The lugs and openings in no way interfere with any of the functional requirements of the spool and this aspect of the invention can be included at substantially no additional cost.

The material of construction of this spool is an impact plastic consisting, for example, of styrene, or a combination of styrene and other plastic materials such as acrylonitrile-butadiene-styrene. These compositions are mentioned not by way of limitation of the invention, but merely to illustrate typical compositions which are usable. The size of the spool can vary of course to suit individual design preference and specific requirements, and I have constructed spools ranging in size from 2½" to 12" in diameter and have suitably wound wire of very fine gauge. When constructed, the spool parts are molded. The two barrel halves to be joined are positioned in a facing relation so that each male section 18 is adjacent or faces a complementary female section 20. The barrel halves 16 are joined at their mating steps 25a, 25b, 25c, 25d, and tapered surfaces 24 in any suitable manner such as: by solvating; by using a bonding agent; by sonic welding, or by employing any one of several other satisfactory bonding expedients. The spool or bobbin 10 is then mounted on a spindle and wire is wound onto the drum 16 until the wire completely fills the space between the drum and the outer diameter of the end flanges. The fully loaded spool is next ready for storage or transporting to the point of use. The spools can be stacked with the lugs or projections 68, 70, 72 fitting into the coacting openings 76, 78, 80 on the adjoining end flange. The improved light weight plastic spool construction represents less inertia for starting and stopping the spool during windup and unwinding operations. In spite of its light weight construction, the spool is nevertheless durable and will resist warping and other distortion in carrying the weight of the wire during transportation as well as during use.

FIGURE 9 shows an exploded perspective view of two identical components in accordance with another embodiment of the invention. In the embodiment of FIGURE 9, two identical and complementary cylindrical spool halves 90, 91 are provided. Around the circumference at one end, each spool half has a predetermined number of tongues 93 which project from a flat end 97 and which are separated by open spaces or grooves 94. Each half also has an inner core 95 and an end flange 96 which may be reinforced by a strengthening disc as previously described. The circumferential dimension of each tongue 93 is substantially equal to the circumferential dimension of each groove 94 in order that the tongues 93 of one spool half may fit into and lap over the grooves 94 of the other spool half to provide a tight fitting spool structure. The two halves 90, 91 may be joined in any suitable manner such as described previously. As shown in FIGURE 9, the projecting tongues 93 have inner and outer surfaces which are substantially parallel to the longitudinal axis of the formed spool. The sides of the tongues 93 are, as shown in the plan view (looking from the inside) of the half 91 in FIGURE 10, tapered from a relatively large circumferential dimension along their bases to a smaller circumferential dimension along their ends. As a consequence, the grooves 94 taper from a large outer dimension to a smaller inner dimension. FIGURE 11 shows an inner plan view of the two joined halves 90, 91, and FIGURES 12 and 13 show cross sectional views taken along the lines 12—12 and 13—13 respectively. From these figures, it will be seen that each spool half has an outer cylindrical portion 92 with generally rectangular inside raised portions 93a extending axially along the length of the cylindrical portion 92. These raised portions 93a extend beyond the flat end 97 to form the tongues 93. The raised portions 93a may also extend in the other direction to the flange 96, so that a generally rectangular groove or slot 98 is formed axially along the length of the cylindrical portion 92 between adjacent pairs of raised portions 93a. These grooves or slots 98 are actually extensions of the grooves 94. These grooves 98 may be preferable where it is desirable to save plastic material. FIGURE 12 shows how the flat ends 97 butt or abut together, and how the projecting tongue 93 of each spool half overlaps and fits in the groove 94 and partially into the groove 98 of the other spool half. And FIGURE 13 shows how the cylindrical portions 92 are joined at their flat ends 97 by a solid mass of tongues 93. As described previously, there may be N tongues 93 and N grooves 94, where N is any integer. The tongues and grooves are shaped in a complementary manner for interfitting. At any transverse circumference, the tongues and grooves have substantially equal circumferential dimensions equal to 180 degrees/N. As also described previously, the halves may be molded of any suitable material, preferably plastic, and joined in any suitable manner.

Figure 14:
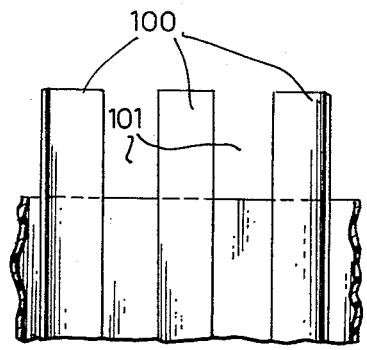
FIGURE 14 is a view of part of the mating portion of a spool component in accordance with another embodiment of the invention.
Figure 15:
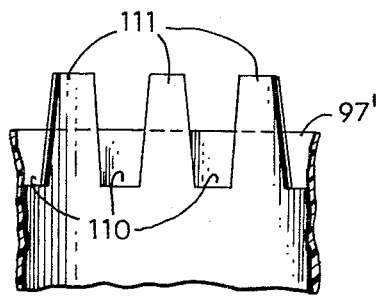
FIGURE 15 is a view of part of the mating portion of a spool component in accordance with another embodiment of the invention.

FIGURE 14 shows a plan view of another embodiment of one of two identical spool halves which may be utilized to form a spool as described above. FIGURE 14 corresponds to FIGURE 10. In the embodiment of FIGURE 14, the tongues 100 have the same circumferential width both at their tip and at their base and between, so that their edges which form the grooves 101 are substantially parallel to the axis of the spool. And FIGURE 15 shows a plan view of another embodiment which may be utilized with the structure of FIGURE 9. In FIGURE 15, the grooves 110 between tongues 111 do not extend all the way to the flanges, but rather terminate at a distance inward from the abutting flat end 97' that permits the tongues 111 to fit between the grooves 110. This provides a stronger, but slightly heavier spool.

Although the present invention has been illustrated and described in connection with several embodiments, it will be understood that these embodiments are illustrative of the invention and are by no means restrictive thereof. It is reasonably to be expected that those skilled in this art can make numerous revisions and adaptations of the invention to suit individual design preferences, and it is intended that such revisions and adaptations which incorporate the herein disclosed principles will be included within the scope of the following claims as equivalents of the invention.

What I claim as new and desire to secure by Letters Patent of the United States is:

1. A spool for winding wire or the like comprising two substantially similar spool halves, each of said halves having a cylindrical barrel with a circumferential abutting edge, said barrel having a predetermined number of substantially, circumferentially spaced male end portions extending longitudinally outward from said abutting edge and between which are formed an equal number of substantially similar female portions extending longitudinally inward from said abutting edge, said male and female portions being at one end of said half and being complementary, an end flange at the other end of each barrel half, said end flange including a plurality of strengthening ribs for resisting both lateral and circumferential stress loading, and means for joining said halves at said one end thereof with each male portion of each end adjacent and partially overlapping female portions of the other barrel half.

2. A molded half portion for forming a spool with two such half portions, said half portion comprising: a cylindrical portion having an abutting surface at one end thereof of said half portion; a predetermined number of tongues positioned circumferentially around said abutting surface and at least partially radially inward of said cylindrical portion; said tongues extending longitudinally in both directions from said abutting surface along said cylindrical portion, each of said tongues being substantially similar and having a circumferential space therebetween; and each of said spaces being substantially similar to each other and to said tongues, and being complementary to said tongues so that the tongues of the other half portion can fit in respective ones of said spaces and at least partially overlap said half portion inwardly of said cylindrical portion.

3. The molded half portion of claim 2 wherein said abutting surface lies in a plane transverse to the longitudinal axis of said cylindrical portion.

4. The molded half portion of claim 3 wherein the outer surface of each tongue is substantially parallel to said longitudinal axis of said cylindrical portion.

5. The molded half portion of claim 3 wherein the sides of each tongue are tapered in a direction from the base of said tongue toward its end.

6. A spool for holding elongated materials, said spool comprising two substantially identical halves joined together at the center portion of the spool, each of said halves being formed by casting and comprising: a cylindrical portion having a substantially smooth cylindrical exterior, a flange at one end of said cylindrical portion, a substantially plane abutting surface at the other end of said cylindrical portion, said plane surface being substantially perpendicular to the longitudinal axis of said cylindrical portion, a plurality of substantially similar spaced tongue structures extending longitudinally along said cylindrical portion in opposite directions from said plane surface, said tongue structures being positioned radially inward of said cylindrical exterior, said tongue structures being spaced and shaped to form an equal plurality of spaces, each adjacent pair of spaces being separated by a tongue structure, and each of said spaces having a configuration that complements one of said tongue structures.

References Cited

UNITED STATES PATENTS

| 1,462,166 | 7/1923 | Chapman | 242—118.6 X |
| 1,739,881 | 12/1929 | Wermine | 242—118.6 |
| 2,190,013 | 2/1940 | Byers | 242—118.4 |
| 2,990,133 | 6/1961 | Tucker | 242—118.7 |
| 3,176,932 | 4/1965 | Kovaleski | 242—118.8 |

FOREIGN PATENTS

| 671,378 | 5/1952 | Great Britain. |
| 957,253 | 5/1964 | Great Britain. |

FRANK J. COHEN, *Primary Examiner.*

G. F. MAUTZ, *Assistant Examiner.*

UNITED STATES PATENT OFFICE
CERTIFICATE OF CORRECTION

Patent No. 3,334,841                                              August 8, 1967

Waldemar W. Burhop

It is hereby certified that error appears in the above numbered patent requiring correction and that the said Letters Patent should read as corrected below.

Column 3, line 11, for "use" read -- used --; column 5, lines 66 and 67, for "substantially," read -- substantially similar, --.

Signed and sealed this 29th day of October 1968.

(SEAL)
Attest:

Edward M. Fletcher, Jr.                                  EDWARD J. BRENNER
Attesting Officer                                              Commissioner of Patents